United States Patent Office 2,901,482
Patented Aug. 25, 1959

2,901,482

MANUFACTURING PROCESS FOR PIPERAZINE

Gordon F. MacKenzie and Kenneth L. Turbin, Midland, Mich., assignors to The Dow Chemical Company, Midland, Mich., a corporation of Delaware No Drawing. Application July 23, 1956
Serial No. 599,291

7 Claims. (Cl. 260—268)

This invention relates to an improved process for the manufacture of piperazine and has particular reference to the manufacture of piperazine from several of the homologous polyamines of ethylene, especially diethylene triamine, in the manner of a continuous process.

There is disclosed in U. S. Patent No. 2,267,686 a method for preparing piperazine from ethylene diamine and polyethylene polyamines. In this method, the conversion of the reactant polyamines is accomplished, according to generally batchwise procedures, at elevated temperatures under superatmospheric pressures in the presence of any one of various common metal hydrogenation catalysts. The piperazine product may be obtained with yields in the neighborhood of 50 percent by practicing the teachings set forth in the referred to patent. Such yields ordinarily are dissatisfactorily low for purposes of commercial operation. In addition, the manner suggested in the patent for conducting the reaction is not usually considered to be attractive or expedient for large scale exploitation.

It would be advantageous for a more practicable and efficient manufacturing process to be available, adapted for utilization on a continuous basis, for converting the homologous polyamines of ethylene, especially the lower homologues and particularly diethylene triamine, in substantial quantities into piperazine. It would be additionally advantageous for purposes of practicing such a process to provide a readily available and economical material as a catalyst which, when employed in accordance with the invention, would be possessed of exceptionally long life as an efficient catalyzing agent.

These desiderata and other benefactions may propitiously be realized according to the manufacturing process for piperazine of the present invention which comprises passing a stream consisting of one or more of the homologous polyamines of ethylene, particularly diethylene triamine, under a pressure between about 300 pounds per square inch and about the liquefying pressure of the reaction mass at the temperature of the reaction over a fixed bed of a catalytic mass, supported on a non-acidic carrier, selected from the group consisting of Raney nickel and Raney cobalt, said catalyst mass being maintained at a temperature between about 150° C. and 250° C., to convert the polyamine to piperazine; withdrawing a piperazine-containing stream from the catalyst bed; and separating a piperazine product from the piperazine-containing stream.

The reaction which occurs may be typified by the following illustration of the conversion of diethylene triamine to piperazine:

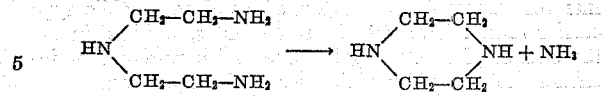

Single pass conversions of the polyamine over the catalyst bed that are in the neighborhood of 75–85 mole percent or more, with piperazine yields in the neighborhood of 70–75 mole percent or more, may, surprisingly enough, be readily achieved with relatively brief residence periods for the polyamine over the catalyst bed.

As indicated, it is particularly advantageous to employ diethylene triamine as the polyamine reactant material that is to be converted to piperazine. However, if desired, polyamine homologues of diethylene triamine, including ethylene diamine, triethylene tetramine, tetraethylene pentamine and the like closely related polyamine compounds that are members of a series that may generically be represented by the structural formula: $H_2N-(C_2H_4NH)_x-H$, wherein $x$ may be any whole integer, as well as mixtures of such polyamines, may also be utilized. The amount of piperazine product that may be obtained in the process depends somewhat upon the particular polyamine reactant material that is being converted as well as upon the specific operating conditions being employed. Likewise, the life and efficiency of the catalyst may usually be found to depend upon the form in which it is embodied for use and also on the manner in which the process is being conducted.

Frequently, for example, the most satisfactory operation may be experienced when the catalyst bed is maintained at a temperature between about 175° C. and 200° C. while passing the polyamine stream thereover under a pressure between about 300 and 1,000 pounds per square inch so that at least a portion of the reaction mass is present in the vapor phase while it is in contact with the catalyst. Such conditions ordinarily secure optimum piperazine yields and promote greatest longevity of the catalyst mass. To these ends, it is usually even more desirable to conduct the process while operating under a pressure that is in the neighborhood of 500 pounds per square inch. At about this pressure level, the conversion of the polyamine reactant materials and yields of the desired product are generally enhanced and the maximum efficient catalyst life may be realized. It is not uncommon at such a pressure for the catalyst mass to have an efficient and satisfactorily useful life that may be so great that from 300 to 400 pounds of the desired product may be obtained per pound of catalyst. In contrast, operation under substantially higher pressures that are sufficient to cause the great preponderance or all of the reaction mass, particularly the generated ammonia therein, to occur as a liquid, say under pressures in the neighborhood of 2,000 pounds or more per square inch, may abbreviate the suitably efficient life of the catalyst to such a degree that as little as 50 pounds or less of the prouct is manufactured per pound of the catalyst.

Advantageously, Raney nickel is employed as the catalyst in the practice of the invention. It may usually be best provided in the form of activated lumps or pellets for incorporation in the fixed bed. Preferably, the Raney nickel catalyst that is utilized is supported on an inactivated nickel-aluminum alloy core. Such form of supported Raney nickel may readily be provided by only partially leaching the aluminum from a conventional Raney nickel alloy in lump form during the activation of the catalyst with sodium hydroxide solution. Lumps of the catalyst that have an average particle size from 1/16 to 1/2 inch are usually satisfactory for employment. If desired, however, the activated metal catalyst may be supported on such other non-acidic carriers as charcoal, magnesium oxide and the like that are inert to the polyamine stream being converted. In any event, a pellet or lump form of the catalyst mass is usually best suited for constituting the fixed bed. It is generally a disadvantage to use an acidic type carrier material such as silica gel and the like for supporting the activated catalyst. Acidic type carrier materials tend to be somewhat solubilized in the the stream of reactant polyamine and may engender inefficiencies and other difficulties in the operation.

It is beneficial for the catalyst mass that is employed to have a surface area of at least about 30 square meters per gram, as measured in conventional determinations with carbon monoxide. Satisfactory results may ordinarily be obtained when the surface area of the catalyst that is employed is approximately 60 square meters per gram.

The operation may usually be most advantageously conducted when the space velocity of the polyamine reactant materials being passed over the fixed bed of catalyst is between about 1 and 3 and, preferably, between about 1.5 and 2 reciprocal hours. The concept of space velocity that is applicable for such determinations does not depend upon the unoccupied free volume in the catalyst bed but may be expressed as being the ratio of the total volume of the reactor that is occupied by the fixed bed of the catalyst mass to the volumetric feed rate of the polyamine stream passing through the catalyst bed per unit of time. This may be represented by the following formula:

$$\frac{\text{Feed rate of polyamine in cubic feet per hour}}{\text{Total occupied volume of catalyst mass in cubic feet}}$$

The greatest efficiency, as pertains to both high yields of desired product and long life of catalyst, may be achieved when the process is conducted under such conditions that the numerical value of a relatively critical factor representing the quotient of the surface area of the catalyst mass divided by the space velocity is between about 10 and 50 and, most advantageously, between about 30 and 45. It is preferable to employ the catalyst in such manner and to so regulate the conduct of the operation that the numerical value of the mentioned factor may fall within the indicated range.

Although various types of apparatus may be utilized in the practice of the present invention in order to confine the catalyst bed and to direct the polyamine reactant material stream thereover, it is advantageous to employ a vertical tower for this purpose. The polyamine feed stream, which beneficially may be preheated, may conveniently be passed through a substantially vertical path over the catalyst bed which is substantially vertically packed or disposed in such a tower by the gravity or pumped flow of the liquid polyamine reactant materials. It is usually of significant benefit to pump the reactant materials so that they may flow in a vertically upward direction through the catalyst bed. This procedure may avoid difficulties that might otherwise be encountered when substantial portions of the ammonia that is generated occupy large volumes of the catalyst bed. The piperazine-containing stream, if desired, can be collected in suitable receivers before separation of the desired product or a continuous product recovery scheme may be effected. It is usually desirable to employ scrubbing apparatus or traps in connection with the piperazine-containing stream being withdrawn from the catalyst bed in order to collect the ammonia that is generated in the reaction. Although, as has been indicated, substantial single pass conversions and yields may be obtained in the practice of the invention, greater operating economies may often be effected by recycling unreacted portions of the polyamine reactant material, including those proportions that may merely have been converted to higher polyethylene polyamines.

The piperazine product may be separated from the stream of converted polyamine being withdrawn from the catalyst bed by various techniques that are apparent to those skilled in the art. It may usually be separated by distillation procedures. However, any desired or required combination of solvent extraction, distillation, precipitation or crystallization and the like may be employed for the isolation and purification of the piperazine product. The catalyst mass that is employed in the present invention may readily be activated for initial use by simply treating it in situ with a solution of sodium hydroxide in a conventional manner after the catalyst has been placed in the reactor in which it is to be maintained.

By way of further illustration, about 24 pounds of a Raney nickel alloy in the form of 1/8 to 1/4 inch lumps having a volume of about 0.2388 cubic foot was provided in a fixed catalyst bed in a cylindrical reactor fabricated from a three inch stainless steel tubing that had a length of about 64 3/4 inches. The Raney nickel alloy was comprised of about 42 percent by weight of nickel with the balance being aluminum. It was maintained in the reactor between a two inch lower layer and a four inch upper layer of 1/4 inch ceramic Berl saddles. The catalyst was activated in place by an initial treatment with a 1 percent by weight aqueous solution of sodium hydroxide followed by a final treatment with 7 percent aqueous sodium hydroxide solution. The initial activating treatment was accomplished by pumping about 80 pounds of the more dilute caustic solution through the Raney nickel alloy lumps during a two hour period at a temperature between about 20 and 91° C. The final treatment involved pumping the stronger solution through the catalyst bed for about 26.6 hours at a rate of about 46 pounds per hour and an average temperature of about 70° C. The volume of the catalyst mass after its activation was about 0.1539 cubic foot and its bed length in the cylindrical reactor was about 41 3/4 inches. The activated lump Raney nickel catalyst had an average surface area of about 62.6 square meters per gram as determined by surface area measurement with carbon monoxide. Its carbon monoxide chemisorption value was about 11.19 cubic centimeters per gram.

A stream comprising a total of about 4,920 pounds of diethylene triamine was pumped, under an average pressure of about 500 pounds per square inch, up through the catalyst in the packed bed which was maintained at an average temperature of about 185° C. The feed rate of the diethylene triamine being passed over the catalyst bed was about 13.94 pounds or 0.235 cubic foot per hour. The process was continued for a total of about 353 hours after an initial 2 1/2 hour period which was utilized to bring the process on stream. The average space velocity effected during the course of the reaction was about 1.528 reciprocal hours. About 78.7 mole percent of the diethylene triamine was converted to various materials from which piperazine, in the amount of about 2477 pounds (representing a yield of about 76.6 mole percent), was obtained. The piperazine-containing stream was continuously collected in ten separate increments during ten intervals of the process. The piperazine product was recovered by distillation through a packed column after the generated ammonia had been stripped from the piperazine-containing stream.

The results that were obtained during each of the intervals of the process are set forth in the following tabulation. In arriving at the overall results, account was taken of about 83.22 pounds of piperazine, 4.06 pounds of ethylene diamine, 8.66 pounds of diethylene triamine and 4.06 pounds of higher polyamines that had collected in the dome of the receiver during the course of the run. An overall material balance of about 98.1 percent was realized.

| Interval | Time of Interval, hours | Wt. of Diethylene Triamine Fed to Catalyst, lbs. | Wt. of Piperazine-Containing Stream Collected from Catalyst, lbs. | Composition of Piperazine-Containing Stream from Catalyst Bed, Percent by wt. | | | | | Conversion of Diethylene triamine, Mole Percent | Yield of Piperazine from Converted Diethylene triamine, mole Percent |
|---|---|---|---|---|---|---|---|---|---|---|
| | | | | Ammonia | Ethylene Diamine | Piperazine | Diethylene Triamine | Higher Polyamines | | |
| 1 | 89.1 | 1,265 | 1,205 | 9.01 | 2.53 | 53.72 | 20.34 | 13.68 | 80.61 | 76.06 |
| 2 | 0.3 | 4 | a5 | 7.42 | 3.71 | 54.14 | 18.93 | 15.79 | | |
| 3 | 24.5 | 343 | 316 | 6.59 | 4.94 | 54.58 | 17.36 | 17.97 | 83.96 | 71.42 |
| 4 | 25.7 | 362 | 341 | 11.61 | 3.37 | 47.59 | 24.51 | 11.26 | 76.90 | 70.0 |
| 5 | 63.7 | 896 | 854 | 8.31 | 3.45 | 51.59 | 20.95 | 15.01 | 80.03 | 73.56 |
| 6 | 15.0 | 210 | 197 | 9.67 | 4.30 | 56.63 | 14.79 | 13.72 | 86.09 | 73.86 |
| 7 | 39.8 | 555 | 540 | 9.83 | 3.75 | 48.86 | 22.94 | 15.91 | 77.67 | 73.50 |
| 8 | 38.5 | 534 | 509 | 9.91 | 4.59 | 41.47 | 24.88 | 17.69 | 76.27 | 62.27 |
| 9 | 48.6 | 648 | 629 | 8.84 | 5.02 | 49.76 | 26.61 | 9.40 | 74.18 | 77.94 |
| 10 | 7.4 | 103 | 99 | 9.39 | 12.12 | 44.04 | 26.06 | 9.89 | 74.95 | 68.0 | a Note.—Probably due to hold up in apparatus from Interval 1 during relatively short Interval 2.

At the termination of the run, about 102.8 pounds of piperazine had been manufactured per pound of catalyst employed in the fixed bed. The remaining catalyst, at this time, was found not to be in an exhausted condition but to have retained about 75 percent of its original activity. In analogous runs operated under conditions similar to those employed in the foregoing illustration, as much as 238 pounds of piperazine were produced per pound of catalyst before its efficiency had almost been reduced to a point at which it was desirable to replace or reactivate the catalyst mass. In comparison, when the process was performed under a pressure of about 2,000 pounds per square inch, the conversion efficiency was substantially reduced and the greatest production of piperazine that could be obtained with each pound of catalyst was about 41.5 pounds, after which the catalyst activity was found to have dropped beneath a suitable level.

When the process is conducted in the illustrated manner with the numerical ratio of the surface area of the catalyst mass to the space velocity at a value less than about 10, undesirably low conversions of the polyamine and yields of piperazine may be generally experienced.

Excellent results may also be obtained when other polyamines of ethylene are converted to piperazine on a continuous basis in accordance with the manufacturing process of the present invention.

What is claimed is:

1. Continuous process for manufacturing piperazine from at least one of the homologous polyamines of ethylene having the formula: $H_2N-(C_2H_4NH)_x-H$, wherein $x$ is an integer from 1 to about 4, which process consists of the essential steps of continuously passing a stream of the polyamine reactant material under a pressure between about 300 pounds per square inch and about the liquefying pressure of the reaction mass at the temperature of the reaction and at a space velocity between about 1 and 3 reciprocal hours over a fixed bed of a catalytic mass, supported on a non-acidic carrier, selected from the group consisting of Raney nickel and Raney cobalt that is maintained at a temperature between about 150° C. and 250° C. to convert the polyamine to piperazine; continuously withdrawing a piperazine-containing stream from the catalyst bed; and subsequently separating a piperazine product from the piperazine-containing stream.

2. Continuous process for manufacturing piperazine from at least one of the homologous polyamines of ethylene having the formula: $H_2N-(C_2H_4NH)_x-H$, wherein $x$ is an integer from 1 to about 4, which process consists of the essential steps of continuously passing a stream of the polyamine reactant material under pressure between about 300 and 1000 pounds per square inch and at a space velocity between about 1.5 and 2 reciprocal hours over a fixed bed of a supported Raney nickel catalyst in particulate form having an average size from about 1/16 to 1/2 inch on a non-acidic carrier maintained at a temperature between about 175° C. and 200° C., said catalyst mass having a surface area that measures at least about 30 square meters per gram, said polyamine reactant material being converted to piperazine over said catalyst bed; continuously withdrawing a piperazine-containing stream from the catalyst bed; and subsequently separating a piperazine product from the piperazine product from the piperazine-containing stream.

3. In the manufacturing process of claim 2, said catalyst mass being supported on an inactivated core of nickel-aluminum alloy.

4. The manufacturing process of claim 2, wherein the numerical value of a factor representing the quotient of the surface area of the catalyst mass divided by the space velocity is between about 10 and 50.

5. In the manufacturing process of claim 2, operating under a pressure in the neighborhood of 500 pounds per square inch.

6. In the manufacturing process of claim 2, maintaining said fixed bed of catalyst in a vertical tower and passing said stream of reactant material vertically upwards through the catalyst bed.

7. The manufacturing process of claim 2, wherein the polyamine reactant material being converted is essentially diethylene triamine.

References Cited in the file of this patent

UNITED STATES PATENTS 2,267,686　　Kyrides _____ Dec. 23, 1941
2,809,195　　Miller _____ Oct. 8, 1957

OTHER REFERENCES

Martin et al.: J. American Chem. Soc., vol. 70, pp. 1817–1818 (1948).